Jan. 19, 1943. G. I. GOODWIN 2,308,604
CLUTCH DRIVEN PLATE ASSEMBLY
Filed June 14, 1939 3 Sheets-Sheet 1
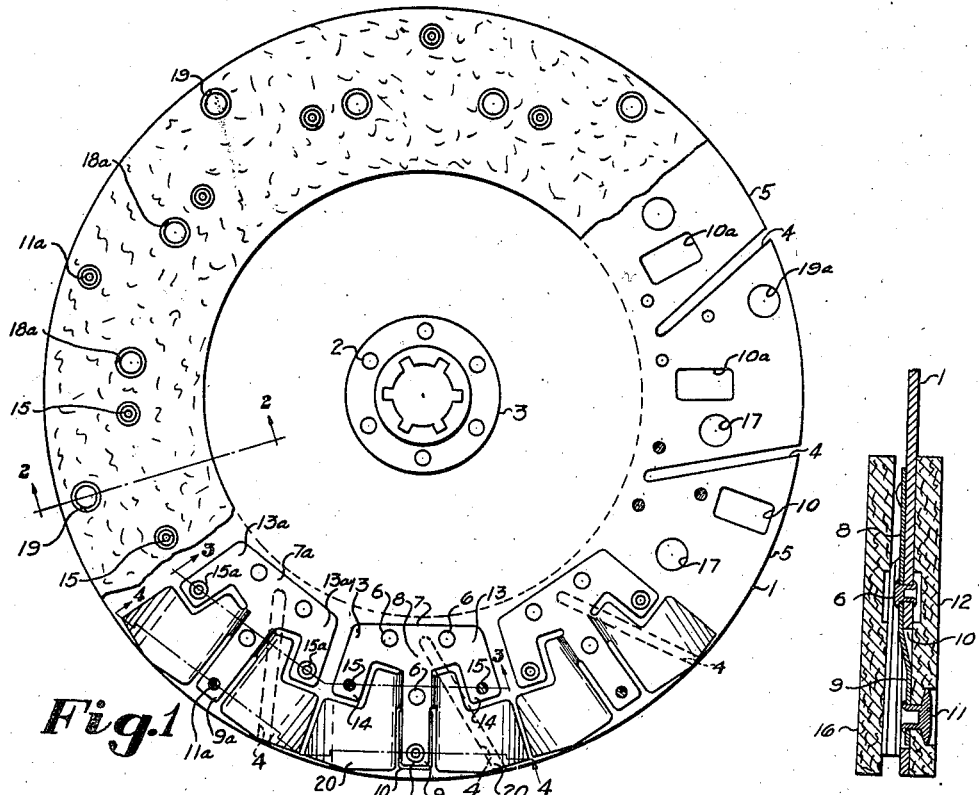
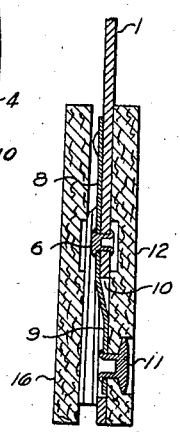
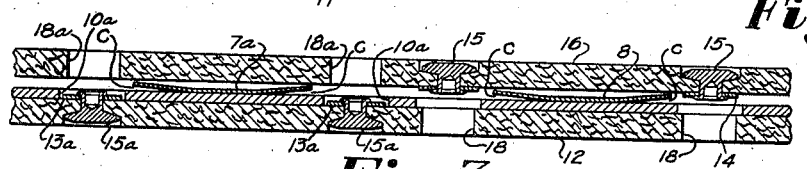
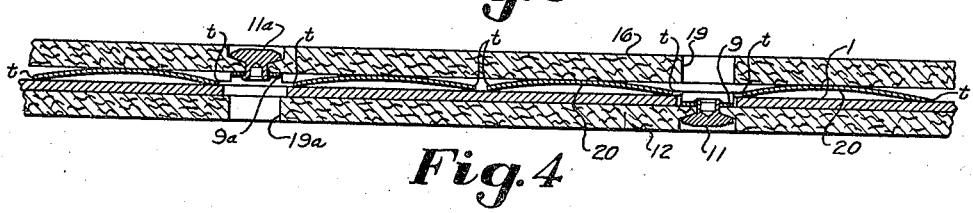
INVENTOR.
GEORGE I. GOODWIN
BY
Horace B. Fay
ATTORNEY.

Jan. 19, 1943.  G. I. GOODWIN  2,308,604
CLUTCH DRIVEN PLATE ASSEMBLY
Filed June 14, 1939  3 Sheets-Sheet 2

INVENTOR.
GEORGE I. GOODWIN
BY
Horace B. Fay
ATTORNEY.

Jan. 19, 1943.   G. I. GOODWIN   2,308,604
CLUTCH DRIVEN PLATE ASSEMBLY
Filed June 14, 1939   3 Sheets-Sheet 3

INVENTOR.
GEORGE I. GOODWIN
BY
Horace B. Fay
ATTORNEY.

Patented Jan. 19, 1943

2,308,604

UNITED STATES PATENT OFFICE 2,308,604

CLUTCH DRIVEN PLATE ASSEMBLY

George I. Goodwin, Cleveland, Ohio

Application June 14, 1939, Serial No. 279,021

8 Claims. (Cl. 192—107)

This invention relates, as indicated, to clutch driven plate assembies for use in friction clutches, particularly as applied to automotive vehicles or to similar adaptations where it is desirable to have a smooth clutching action during engagement.

The primary object of the invention is to provide a clutch plate having means for mounting and attaching friction facings in proper position so that they will be maintained in positive driving relation and will at the same time be capable of cooperating with and moving with the cushioning means of the clutch plate to effect smooth action during engagement.

Another object of the invention is to provide a suitable cushioning support for one of the friction facings, which is of such a nature as to provide a large number of points of support of such shape, position and action that the unit pressure over the entire friction face will be approximately uniform whenever the friction clutch is completely engaged.

Another object of the invention is to provide a type of facing mounting in which the facings are not rigidly attached to the disc but are capable of a limited degree of movability, whereby they may more easily align themselves during assembly, and will have less tendency to become distorted out of position when the plate is subjected to heat, as during use in a car.

Other objects and advantages of the invention will be apparent during the course of the following description.

In the accompanying drawings, forming a part of this specification, and in which like numerals are employed to designate like parts throughout the same, Fig. 1 is a plan view of a clutch driven plate assembly, embodying the invention, with some portions broken away and other portions omitted in order to more clearly illustrate the construction;

Fig. 2 is a cross-sectional view, on an enlarged scale, taken on the line 2—2 of Fig. 1;

Fig. 3 is a cross-sectional view, on an enlarged scale, taken on the line 3—3 of Fig. 1;

Fig. 4 is a cross-sectional view, on an enlarged scale, taken on the line 4—4 of Fig. 1;

Figure 5:
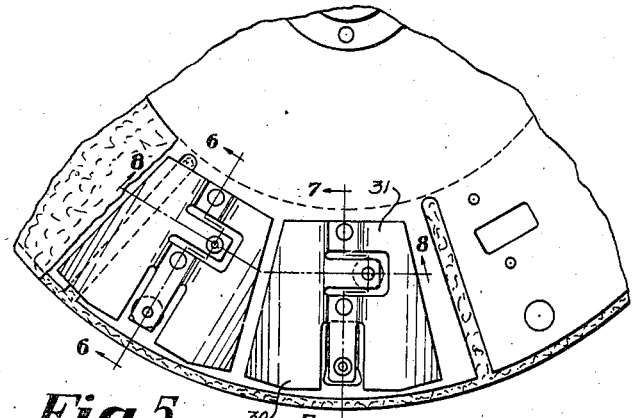
Fig. 5 is a fragmentary plan view of a modified form of clutch driven plate assembly, embodying the invention.
Figure 6:
Fig. 6 is a cross-sectional view, on an enlarged scale, taken on the line 6—6 of Fig. 5.
Figure 7:
Fig. 7 is a cross-sectional view, on an enlarged scale, taken on the line 7—7 of Fig. 5.
Figure 8:
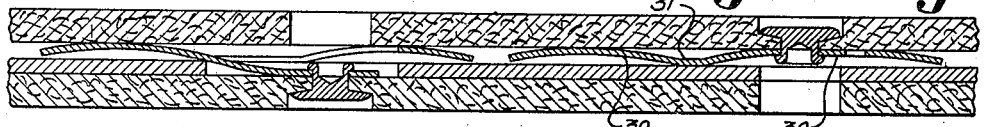
Fig. 8 is a cross-sectional view taken on the line 8—8 of Fig. 5.

Referring more particularly to Figs. 1 to 4 inclusive, the plate assembly therein shown comprises a disc 1, which is secured, as by rivets 2, to a central hub member 3. If desired, vibration dampeners or additional cushioning means (not shown) of a conventional character may be interposed between the disc and the hub member.

The disc 1 is preferably formed of steel, and is provided with a multiplicity of slots 4 extending inwardly from the periphery of the disc, such slots dividing the radially outer portions of the disc into segments 5, thereby reducing warpage and distortion which would otherwise result from the heating up of the disc during normal usage.

Secured to one face of the disc 1, as by means of tubular rivets 6, are cushioning springs 7, each of such springs having a central flat portion 8, the radially outermost portion 9 of which is bent, as shown in Fig. 2, so as to lie within a correspondingly shaped but somewhat larger opening 10 in the disc 1. Secured to such portions 9 of the springs 7, as by means of rivets 11, is an annular facing 12 of friction material.

The springs 7 are also provided with substantially flat wing portions or arms 13, which extend substantially radially of the disc 1, and are disposed laterally of the central portion 8. The radially outward portions of these arms 13 are bent or displaced in a direction opposite to that of the portions 9 of the springs to provide portions 14, to which is secured, as by rivets 15, an annular facing 16 of friction material. To provide clearance for the rivets 15, circular openings 17 are provided in the disc 1, and openings 18 are provided in the facing 12. Similarly, to provide clearance for the rivets 11, circular openings 19 are provided in the facing 16.

Each of the springs 7 is further provided with wing portions 20 which are bowed in a direction circumferentially of the disc 1 to provide cushions for normally supporting the friction facing 16 in spaced relation to the disc 1, as clearly shown in Fig. 4. These cushion portions 20 are so formed as to provide supports for the facing 16, which supports increase in area circumferentially as the deflection of the cushion portions 20 increases under the load of the clutch engagement. In other words, the springs are so formed that at no load the contact between the cushion portions 20 and the facing 16 is a line at the high point of the curved cushion portions 20. As the compression load increases, this contact spreads in width in both directions circumferentially until at full compression load, the area of contact has spread over the entire width of the cushion portions 20 of the springs.

In a radial direction, the high points of the curve of the cushion portions 20 of the springs, that is, the contact lines to which reference has been made, are slightly closer to the disc 1 at the radially inward portion of the facing 16 than at the radially outward portion thereof. In this way, the facing 16, which is supported directly on the cushion portions 20 of the springs, is maintained in a slightly concave condition while under no load, as clearly shown in Fig. 2. The facing 12, on the other hand, which is supported against the disc 1, is at all times maintained in a flat condition.

As the engagement load is applied, the concave surface of the facing 16 gradually becomes flattened, and in this way, the contact area between the facing 16 and the adjacent clutch part, such as the clutch pressure plate (not shown) gradually increases, the increase being in a radial direction from the outer peripheral edge of the friction facing 16 to the inner edge thereof.

Except as the radially outermost extremities t (Fig. 4) of the marginal edges of the cushion portions 20 of the springs, such marginal edges do not contact the surface of the disc until such cushion portions are fully compressed, that is, at the full clutch engagement load. In other words, at any load less than the full load, all points at the marginal edges in question which are radially inward of the points t, are spaced from the disc 1, as indicated by the clearance spaces C in Fig. 3. As a result, the maximum resistance of the clutch engagement pressure is obtained at the radially outermost portion of the friction facing 16.

Disposed in alternate arrangement with the springs 7 are springs 7a, which are identical in every respect with the springs 7, with the exception that the radially outermost portions 9a thereof are bent in direction oppositely to the portions 9 of the springs 7, and are secured to the friction facing 16, as by means of rivets 11a, clearance holes 19a being provided in the friction facing 12 for such rivets. Moreover, the radially outward wing portions or arms 13a of such springs are bent in a direction oppositely to the corresponding portions of the arms 13 of the springs 7, and lie within correspondingly shaped, but larger, openings 10a in the disc 1, the friction facing 12 being secured to such portions 13a as by means of rivets 15a. Clearance holes 18a are provided in the friction facing 16 for the rivets 15a.

In that form of the invention shown in Figs. 5, 6, 7 and 8, the cushion portions 30 of the springs 31 are similar in their construction and supporting action to the cushion portions 20 of the springs 7, but the cushion portions 30 extend radially substantially the entire width of the friction facings, and are somewhat narrower than the cushion portions 20 of the springs 7.

Figure 9:
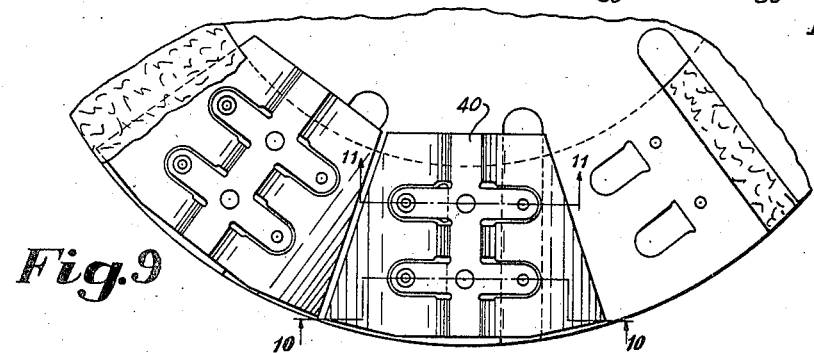
Fig. 9 is a view similar to Fig. 5, but showing another modified form of a clutch driven plate assembly embodying the invention.
Figure 10:
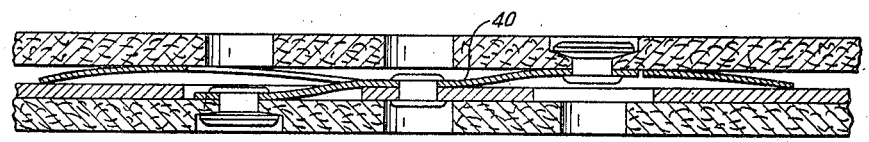
Fig. 10 is a cross-sectional view, on an enlarged scale, taken on the line 10—10 of Fig. 9.
Figure 11:
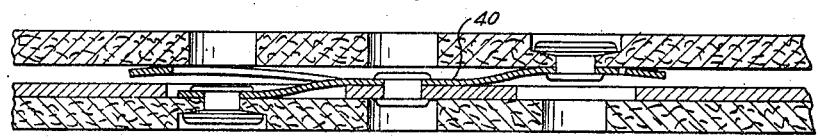
Fig. 11 is a cross-sectional view, on an enlarged scale, taken on the line 11—11 of Fig. 9.
Figure 12:
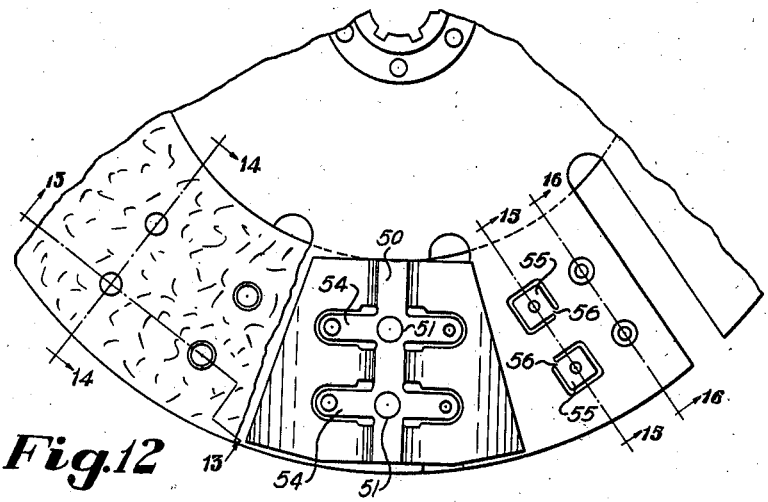
Fig. 12 is a view similar to Figs. 5 and 9, but showing a still further modified form of a clutch driven plate assembly, embodying the invention.
Figure 13:
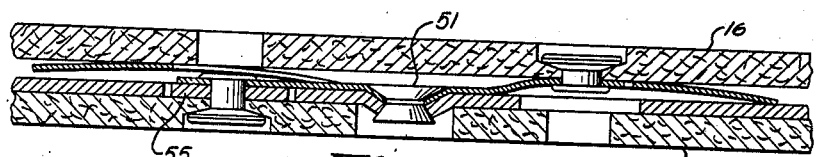
Fig. 13 is a cross-sectional view, on an enlarged scale, taken on the line 13—13 of Fig. 12.
Figure 14:
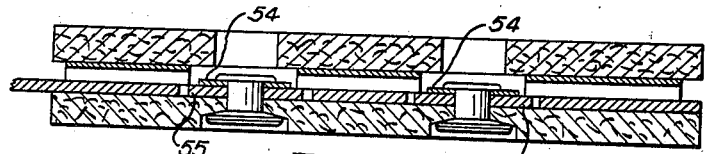
Fig. 14 is a cross-sectional view, on an enlarged scale, taken on the line 14—14 of Fig. 12.
Figure 15:
Fig. 15 is a cross-sectional view, on an enlarged scale, taken on the line 15—15 of Fig. 12.
Figure 16:
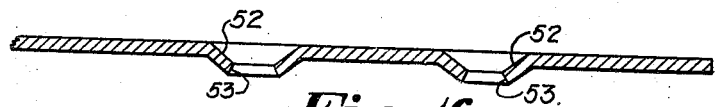
Fig. 16 is a cross-sectional view, on an enlarged scale, taken on the line 16—16 of Fig. 12.

In that form of the invention illustrated in Figs. 9, 10 and 11, the springs 40 are somewhat similar to the springs 31, the principal difference being in the arrangement of the means for attaching the springs to the friction facings.

In that form of the invention shown in Figs. 12 to 16 inclusive, the springs 50 are similar to the springs 40, but in this case, the rivets 51, which secure the springs to the disc, instead of having heads on both ends of the character shown in Figs. 10 and 11, are of the double countersunk type. To permit the use of this type of rivet, correspondingly shaped recesses 52 and 53 are formed in the springs and in the disc. When employing such rivets, it is not necessary to employ clearance holes for the rivets in the friction facing 16.

Moreover, as clearly shown in Figs. 12, 13, 14 and 15, the arms 54 of the springs 50 are not bent at their extremities to provide portions which lie within openings in the disc, as in the other forms of the invention which have been described, but are secured to spacer blocks 55, which are formed integrally with the disc. In this way, a flexible mounting of the friction facing 12 is secured by attaching such facing to the arms 54 through the intermediary of the interposed spacer blocks 55. The blocks 55 need not be formed integrally with the disc, but where so formed, they are left attached to the disc by the connector portions 56. The dimensions of such connector portions are so small that under the slightest strain, they will fail, thereby leaving the support for the friction facing 12 entirely upon the arms 54.

It will be noted that in each case, the facings are not attached rigidly to the disc but are flexibly maintained in assembled relation with the disc by means of arms which are formed integrally with the springs, and which I therefore term "spring arms." This permits the facings to more easily align themselves during assembly, and will cause them to have less tendency to become distorted out of position when the plate is subjected to heat as during use in a car. Often, in conventional mountings, where the facings are attached directly to the disc or to the cushion springs or to both, there is a marked tendency for the plate, when heated, to become distorted and to expand in thickness, thus causing difficulties in securing a clean release of the clutch. This results because of the greater rate of expansion of the steel parts as compared to the facing materials, and is overcome in the present case by providing the flexible spring arms to which both of the facings are attached.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a clutch plate comprising a disc and a facing, a spring arm for securing said facing to said disc, a spacer block between said facing and said arm, said spacer block being formed integrally with said disc.

2. In a clutch plate comprising a disc and a facing attached by means of a spring arm, a spacer between said facing and said arm, said spacer being formed integrally with said disc and being connected to said disc by a fragile connecting link.

3. In a clutch plate comprising a disc and a facing, a spring arm for securing said facing to said disc, a spacer between said spring arm and said facing, said spacer being coplanar with said disc.

4. In a clutch plate, a disc, facings therefor overlying the face of the outer marginal portion of said disc, members each having portions secured to said marginal portion of the disc, other portions formed integrally with said first-named portions and shaped to provide resilient supports for one of said facings, other portions integral with said first-named portions for flexibly attaching said resiliently-supported facing to said disc, and still other portions extending into openings in said marginal portion of the disc for flexibly attaching the other facing to said disc, said resilient supports directly engaging one face of said marginal portion of said disc.

5. In a clutch plate, a disc, a facing therefor overlying the faces of the outer marginal portion of said disc, members each having portions secured to said marginal portion of the disc, other portions formed integrally with said first-named portions and shaped to provide resilient supports for one of said facings, and still other portions integral with said first-named portions for flexibly attaching both of said facings to said disc, said resilient supports engaging said supported facings by contact lines which are closer to said disc at the radially inward portion of said supported facing than at the radially outward portion thereof and also having marginal edge portions having a point contact with said disc.

6. In a clutch plate, a disc, facings therefor overlying the opposite faces of the outer marginal portion of said disc, means for movably mounting said facings on said disc including members each having portions secured to said marginal portion of the disc, wing portions formed integrally with said first named portions and shaped to provide resilient supports for one of said facings, and yieldable facing-mounting portions integral with said first named portions and terminating on opposite sides of the median plane of said disc, together with means securing the facings to the respective mounting portions to thereby flexibly connect both facings to said disc, said resilient supports directly engaging one face of said marginal portion of said disc.

7. In a clutch plate, a disc, facings therefor overlying the opposite faces of the outer marginal portion of said disc, means for movably mounting said facings on said disc including members each having portions secured to one face of said disc, wing portions formed integrally with said first named portions and shaped to provide resilient supports for one of said facings, and flexible facing-mounting portions integral with said first named portions, said disc being provided with a series of circumferentially spaced openings, certain of said flexible mounting portions extending through said openings to the opposite face of the disc, together with means securing the facings to the respective mounting portions to thereby yieldably connect both facings to said disc, said resilient supports directly engaging one face of the marginal portion of said disc beneath one of said facing members.

8. In a clutch plate, a disc provided with a series of circumferentially spaced openings in the marginal portion thereof, a plurality of facing-securing members each including a central, flattened body portion secured to one face of the disc, integral resilient cushioning wings on opposite sides of the central flattened portion, said cushioning wings being bent out of the median plane of said central portion in one direction, and integral yieldable facing-mounting arms, said arms being bent out of the median plane of said body portion in opposite directions respectively, some of said arms extending through said openings beyond the median plane of the disc, and facing members disposed on opposite faces of said disc and secured to the respective arms, the said cushioning wings being disposed between one facing member and the contiguous surface of the disc, the other facing member lying substantially in face contact with the opposite face of the disc.

GEORGE I. GOODWIN.